(12) United States Patent
Wang et al.

(10) Patent No.: US 9,268,449 B2
(45) Date of Patent: Feb. 23, 2016

(54) TOUCH PANEL

(71) Applicant: Wistron Corporation, New Taipei (TW)

(72) Inventors: Kuo-Hsing Wang, New Taipei (TW);
Yao-Tsung Chang, New Taipei (TW);
Chih-Chung Chiang, New Taipei (TW);
Chu-Chia Tsai, New Taipei (TW);
Hsih-Bin Dai, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/283,232

(22) Filed: May 21, 2014

(65) Prior Publication Data

US 2015/0212632 A1      Jul. 30, 2015

(30) Foreign Application Priority Data

Jan. 29, 2014  (TW) ............................. 103103581 A (51) Int. Cl.
   *G06F 3/044* (2006.01)
(52) U.S. Cl.
   CPC ...... *G06F 3/044* (2013.01); *G06F 2203/04107* (2013.01); *G06F 2203/04111* (2013.01)
(58) Field of Classification Search
   CPC .................................................. G06F 3/041
   USPC .......................................................... 345/173
   See application file for complete search history.

(56) References Cited

U.S. PATENT DOCUMENTS

| 2008/0062148 A1* | 3/2008 | Hotelling et al. ............. 345/174 |
| 2010/0302178 A1 | 12/2010 | Liu et al. |
| 2012/0182233 A1 | 7/2012 | Kim |
| 2014/0016048 A1 | 1/2014 | Omote et al. |

FOREIGN PATENT DOCUMENTS

| CN | 101882021 | 11/2010 |
| KR | 1020140011113 | 1/2014 |
| TW | 201248801 | 12/2012 |

OTHER PUBLICATIONS

"Office Action of Korean Counterpart Application," issued on Oct. 7, 2015, with English translation thereof, p1-p11, in which the listed references were cited.
"Office Action of Japan Counterpart Application with partial English translation", issued on Aug. 25, 2015, p1-p8, in which the listed reference was cited.

* cited by examiner

*Primary Examiner* — Shaheda Abdin
(74) *Attorney, Agent, or Firm* — Jianq Chyun IP Office (57) ABSTRACT

A touch panel including a substrate, first sensing series, second sensing series, first lines and second lines is provided. Each first sensing series includes first electrode portions and first crossing portions. Each second sensing series includes second electrode portions and second crossing portions. Any adjacent two among the first electrode portions and the second electrode portions are separated by a spacing region. Each first crossing portion crosses one second crossing portion. The first lines respectively connect to the first sensing series and extend to a bonding region of the substrate. The second lines are disposed along the spacing region to respectively connect to the second sensing series and extend to the bonding region. One second line connected to an $N^{th}$ second sensing series crosses one second crossing portion of an $M^{th}$ second sensing series, wherein N and M are different positive integers.

17 Claims, 10 Drawing Sheets

TOUCH PANEL

CROSS-REFERENCE TO RELATED APPLICATION

This application claims the priority benefit of Taiwan application serial no. 103103581, filed on Jan. 29, 2014. The entirety of the above-mentioned patent application is hereby incorporated by reference herein and made a part of this specification.

BACKGROUND OF THE INVENTION

1. Field of the Invention

The invention relates to a touch panel, and more particularly, to a touch panel with narrow border design.

2. Description of Related Art

With the blooming development in the electronic technology, and the prevalence of wireless communication and the Internet, various electronic products are gradually becoming indispensable in people's day-to-day life and work. For achieving the operation of the electronic device, the most common input-output (I/O) interface includes a keyboard, a mouse or a touch panel. Compared with the keyboard and the mouse, the touch panel is a simpler I/O interface which facilitates an intuitive operation. Therefore, the touch panel is usually applied as a communication interface between human and electronic device.

In addition to high sensibility and high precision, as a current trend in developing the touch panel, the border of the touch panel is required to be reduced as possible in order to satisfy demands of customer for exterior appearance of the electronic products. However, sensing electrodes of existing touch panel still need conductive lines for electrically connecting the sensing electrodes to bonding pads while some of the electrodes are extended laterally and the conductive lines connect the laterally extended sensing electrodes to the pads located at a side of the touch panel. Accordingly, a reserve area for disposing the conductive lines must be reserved at lateral sides of the touch panel, which makes it difficult to realize the touch panel with the narrow border design or even a borderless design.

SUMMARY OF THE INVENTION

The invention is directed to a touch panel having a narrow border design or even a borderless design.

A touch panel according to an embodiment of the invention includes a substrate, a plurality of first sensing series, a plurality of second sensing series, a plurality of first lines and a plurality of second lines. The substrate has a bonding region and a sensing region adjacent to each other on a first direction. The first sensing series are disposed in the sensing region. Each of the first sensing series includes a plurality of first electrode portions and a plurality of first crossing portions which are alternately connected along the first direction. The second sensing series are disposed in the sensing region. Each of the second sensing series includes a plurality of second electrode portions and a plurality of second crossing portions which are alternately connected along the second direction, and the first direction intersects the second direction. Each of the second crossing portions crosses one of the first crossing portions; and any adjacent two among the second electrode portions and the first electrode portions, any adjacent two among the first electrode portions, and any adjacent two among the second electrode portions are separated by a spacing region, respectively. The first lines respectively connect to the first sensing series and extend to the bonding region. The second lines respectively connect to the second sensing series and extend to the bonding region. Each of the second lines is disposed along the spacing region. One of the second lines connected to an $N^{th}$ second sensing series crosses one of the second crossing portions of an $M^{th}$ second sensing series, wherein N and M are positive integers, and N is not equal to M.

In an embodiment of the invention, the second electrode portions of each of the second sensing series include two terminal electrode portions and at least one intermediate electrode portion, and the intermediate electrode portion is disposed between the two terminal electrode portions. The second lines are disposed between the terminal electrodes of the second sensing series.

In an embodiment of the invention, the boding region is adjacent to ends of the first sensing series.

In an embodiment of the invention, the boding region includes a first bonding region and a second bonding region, wherein the sensing region is located between the first bonding region and the second bonding region. The first lines extend to the first bonding region, and the second lines extend to the second bonding region.

In an embodiment of the invention, the first sensing series and the second electrode portions are made of a first layer, the second crossing portions are made of a second layer, and the first crossing portions and the second crossing portions are spaced apart by a first insulation layer. Meanwhile, the second lines may be made of the first layer, and the second line connected to the $N^{th}$ second sensing series and the second crossing portion of the $M^{th}$ second sensing series are spaced apart by the first insulation layer. Or, the second lines are made of a third layer, the first layer and the second layer are disposed between the third layer and the substrate, and the second line connected to the $N^{th}$ second sensing series and the second crossing portion of the $M^{th}$ second sensing series are spaced apart by a second insulation layer.

In an embodiment of the invention, the second sensing series and the first electrode portions are made of a first layer, the first crossing portions are made of a second layer, and the first crossing portions and the second crossing portions are spaced apart by an insulation layer. Accordingly, the second lines may be made of the first layer, and the second line connected to the $N^{th}$ second sensing series and the second crossing portion of the $M^{th}$ second sensing series are spaced apart by the insulation layer.

In an embodiment of the invention, a length distribution of the second lines is gradually increased before gradually decreasing in sequence along the second direction.

An electronic device according to an embodiment of the invention includes aforesaid touch panel and a display panel. The display panel has a display surface, and the touch panel is disposed on the display surface.

In an embodiment of the invention, the touch panel further includes a cover plate, and the substrate is attached on the cover plate. The cover plate has a light shielding region, wherein the light shielding region blocks the bonding region. A border width of the light shielding region at two opposite sides along the second direction is less than 5 mm.

Based on above, the lines for signal transmission are disposed on the spacing region between the electrode portions of the sensing series in the touch panel according to the embodiments of the invention. Accordingly, the lines extending along a longitudinal direction of the substrate need not be disposed at additional border regions outside the area of the sensing series on a transverse direction of the substrate. Or, the lines extending along the transverse direction of the substrate need not be disposed at additional border regions outside the area of the sensing series on the longitudinal direction of the substrate. As a result, the touch panel having the narrow border design or even the borderless design may be provided according to the embodiments of the invention.

To make the above features and advantages of the disclosure more comprehensible, several embodiments accompanied with drawings are described in detail as follows.

DESCRIPTION OF THE EMBODIMENTS

Figure 1:
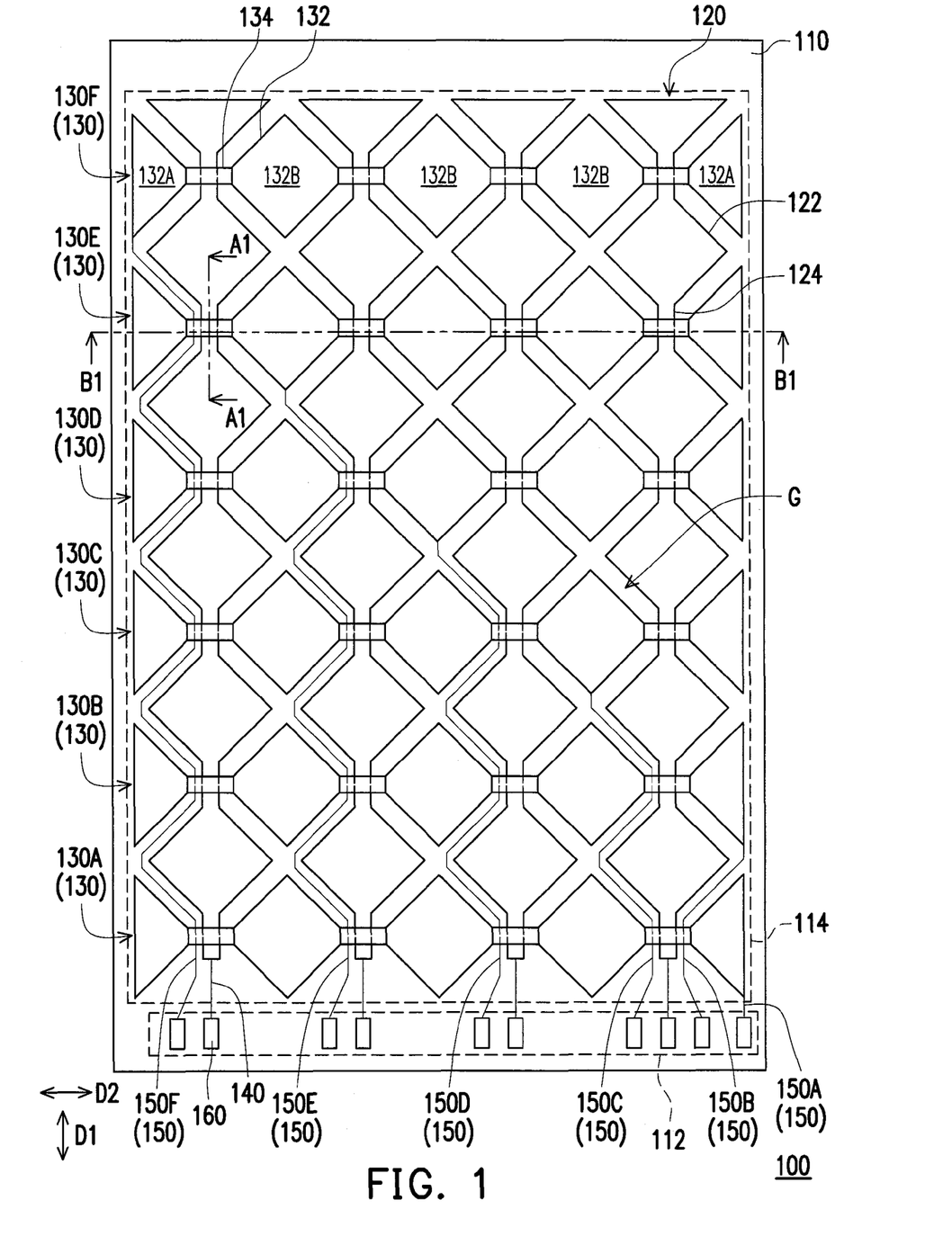
FIG. 1 is a top view of a touch panel according to first embodiment of the invention.
Figure 2:
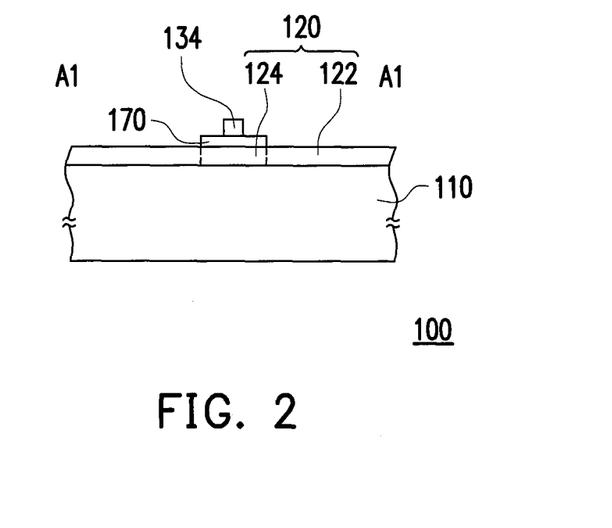
FIG. 2 is a cross-sectional view illustrating the touch panel of FIG. 1 along a sectional line A1-A1.
Figure 3:
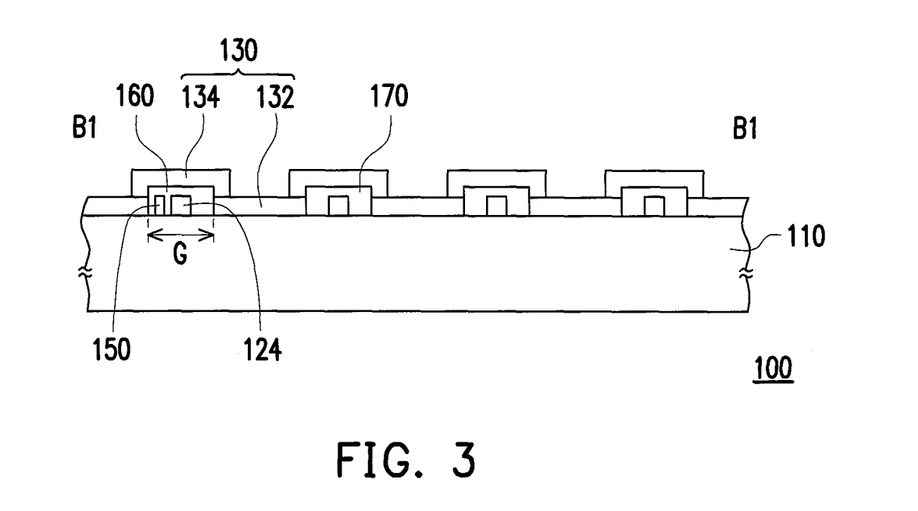
FIG. 3 is a cross-sectional view illustrating the touch panel of FIG. 1 along a sectional line B1-B1.

FIG. 1 is a top view of a touch panel according to first embodiment of the invention, FIG. 2 is a cross-sectional view illustrating the touch panel of FIG. 1 along a sectional line A1-A1, and FIG. 3 is a cross-sectional view illustrating the touch panel of FIG. 1 along a sectional line B1-B1. Referring to FIG. 1, a touch panel 100 includes a substrate 110, a plurality of first sensing series 120, a plurality of second sensing series 130, a plurality of first lines 140 and a plurality of second lines 150. The substrate 110 has a bonding region 112 and a sensing region 114 adjacent to each other on a first direction D1. The first sensing series 120 are disposed in parallel in the sensing region 114. The second sensing series 130 are also disposed in parallel in the sensing region 114. The first lines 140 respectively connect to the first sensing series 120 and extend to the bonding region 112. The second lines 150 respectively connect to the second sensing series 130 and extend to the bonding region 112. Each of the first sensing series 120 extends along the first direction D1, and each of the second sensing series 130 extends along a second direction D2, wherein the first direction D1 intersects the second direction D2. In the present embodiment, the first direction D1 is perpendicular to the second direction D2. However, in other embodiments, the first direction D1 and the second direction D2 may not be perpendicular to each other. In addition, a plurality of pads 160 may be disposed in the bonding region 112, the first lines 140 and the second lines 150 respectively extend to the pads 160. Nevertheless, in other embodiments, ends of the first lines 140 and the second lines 150 extended to the boding region 112 may be directly used to connect to a circuit board or external circuits to be considered as the pads. Accordingly, the pads 160 and the lines 140 and 150 may be integrated as one in the touch panel 100.

More specifically, each of the first sensing series 120 includes a plurality of first electrode portions 122 and a plurality of first crossing portions 124 which are alternately connected along the first direction D1. Each of the second sensing series 130 includes a plurality of second electrode portions 132 and a plurality of second crossing portions 134 which are alternately connected along the second direction D2. Meanwhile, each of the second crossing portions 134 crosses one of the first crossing portions 124, and any adjacent two among the second electrode portions 132 and the first electrode portions 122 are spaced apart by a spacing region G. In view of FIG. 1, the first electrode portions 122 are portions of the first sensing series 120 which are relatively wider in width, whereas the first crossing portions 124 are portions of the first sensing series 120 which are relatively narrower in width. Similarly, the second electrode portions 132 and the second crossing portion 134 also include a size relation identical to the above. Further, each of the first electrode portions 122 and the second electrode portions 132 includes a contour outline similar to a diamond-shape, and the spacing region G is distributed on regions between the electrode portions 122 and 132 of the diamond-shape. Accordingly, the spacing region G shows a distribution of grids in FIG. 1.

Because the bonding region 112 is adjacent to ends of the first sensing series 120, each of the first lines 140 extends from the connected first sensing series 120 outwardly along the first direction D1 to the bonding region 112. Further, each of the second lines 150 also extends from the connected second sensing series 130 to the bonding region 112. However, in the present embodiment, each of the second lines 150 is disposed along the spacing region G. Therefore, each of the second lines 150 is bent into zigzag shape along the spacing region G. In the present embodiment, the second electrode portions 132 of each of the second sensing series 130 include two terminal electrode portions 132A and at least one intermediate electrode portion 132B, and the intermediate electrode portion 132B is located between the two terminal electrode portions 132A. Meanwhile, all of the second lines 150 are disposed between the terminal electrodes 132A of the second sensing series 130. In other words, it is not required to dispose any lines between ends of the second sensing series 130 and edges of the substrate 110, such that the touch panel 100 may provide a thin border or no border at all. It should be noted that, the so-called border refers to a region between the ends of the second sensing series 130 and the edges of the substrate 110 in which a region between the ends of the first sensing series 120 and the edge of the substrate 110 (e.g., the bonding region 112) may not be included.

In addition, the second lines 150 are disposed in the spacing region G, thus a part of the second lines 150 may cross over at least one of the second sensing series 130. More specifically, one of the second lines 150 connected to an $N^{th}$ second sensing series 130 crosses one of the second crossing portions 134 of an $M^{th}$ second sensing series 130, wherein N and M are positive integers, and N is not equal to M. In view of FIG. 1, after outwardly arranging serial numbers in sequence from the bonding region 112, the second sensing series 130 are arranged into the second sensing series 130A to 130F, and a 1$^{st}$ second sensing series 130A to a 6$^{th}$ second sensing series 130F respectively connect to the second lines 150A to 150F. Accordingly, the second line 150B connected to the 2$^{nd}$ second sensing series 130B crosses one of the second crossing portions 134 of the 1$^{st}$ second sensing series 130A. The second line 150C connected to the 3$^{rd}$ second sensing series 130C crosses one of the second crossing portions 134 of the 1$^{st}$ second sensing series 130A and one of the second crossing portions 134 of the 2$^{nd}$ second sensing series 130B. Accordingly, the second line 150F connected to the 6$^{th}$ second sensing series 130F crosses one of the second crossing portion 134 in each of the 1$^{st}$ to 5$^{th}$ second sensing series 130A to 130E.

In the present embodiment, the first sensing series 120 and the second sensing series 130 are crossing each other, but the first sensing series 120 and the second sensing series 130 must be electrically independent from each other in order to realize touch-sensing functions. Accordingly, referring to FIG. 2 and FIG. 3, the touch panel 100 further includes an insulation layer 170, wherein the insulation layer 170 is disposed between crossing elements so as to maintain electrically independent for both the first sensing series 120 and the second sensing series 130.

In view of FIG. 2 and FIG. 3, the entire first sensing series 120 and the second electrode portions 132 of the second sensing series 130 are made of a first layer, and the second crossing portions 134 of the second sensing series 130 are made of a second layer. The first layer and the second layer are spaced apart by the insulation layer 170. More specifically, the insulation layer 170 is at least disposed at portions where the first layer and the second layer cross each other. In other words, the insulation layer 170 may be a plurality of island insulators respectively located between first crossing portions 124 and the second crossing portions 134 which cross each other.

In the present embodiment, the second lines 150 connected to the second sensing series 130 may also be made of the first layer. In view of FIG. 1, a part of the second lines 150 crosses a part of the second crossing portions 134. Accordingly, the insulation layer 170 may also be disposed between the second lines 150 and the second crossing portions 134 which cross each other. As a result, a relation in which the first sensing series 120 and the second sensing series 130 are electrically independent from each other may be realized by disposing the insulation layer 170.

The first sensing series 120, the second electrode portions 132 and the second lines 150 are made of the first layer and capable of being manufactured in the same manufacturing step. Therefore, even though the part of second lines 150 are disposed to cross the part of the second crossing portions 134, it does not make an overall manufacturing process more complicated. Instead, the second lines 150 disposed and distributed along the spacing region G may provide the thin border, or even to realize a borderless design for the touch panel 100.

Figure 4:
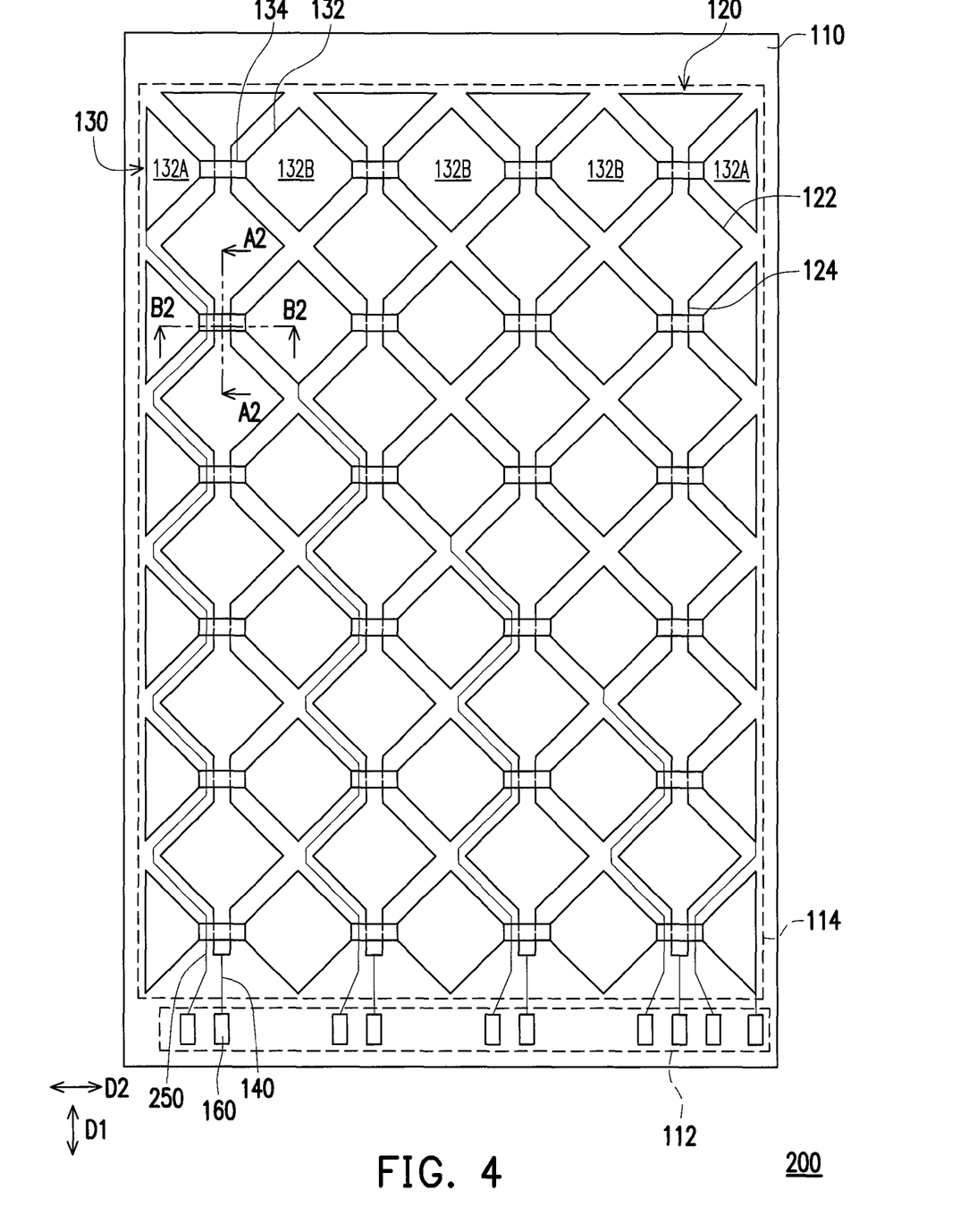
FIG. 4 is a top view of a touch panel according to second embodiment of the invention.
Figure 5:
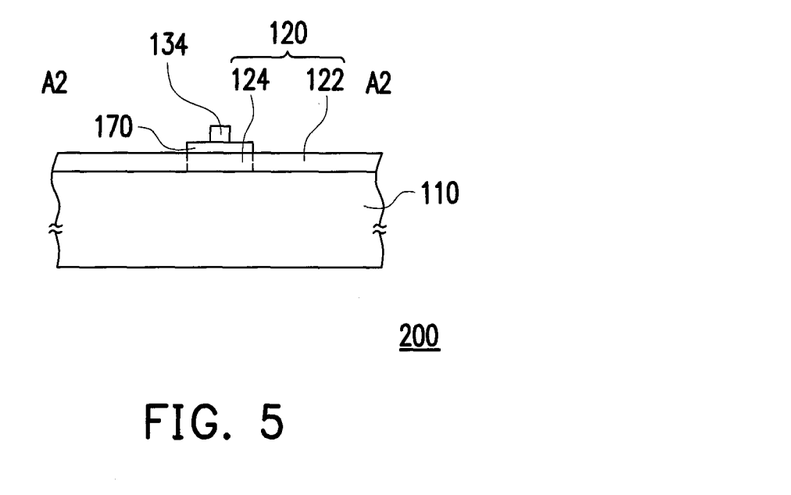
FIG. 5 is a cross-sectional view illustrating the touch panel of FIG. 4 along a sectional line A2-A2.
Figure 6:
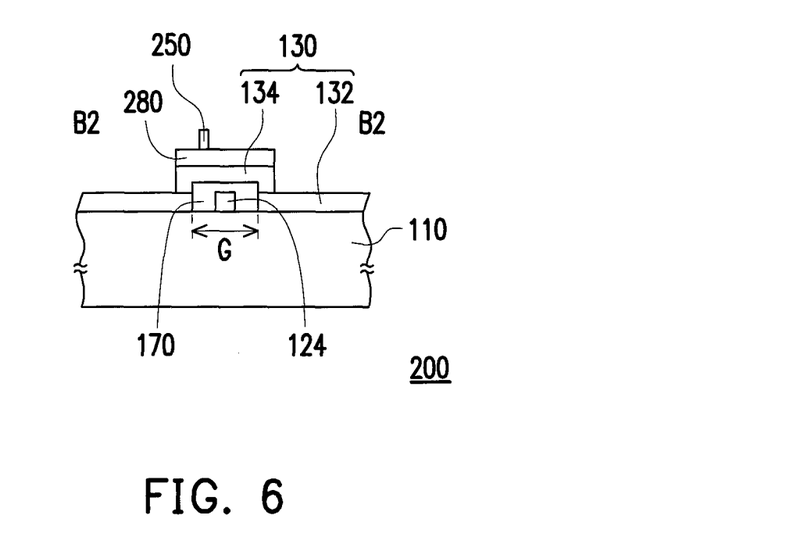
FIG. 6 is a cross-sectional view illustrating the touch panel of FIG. 4 along a sectional line B2-B2.

FIG. 4 is a top view of a touch panel according to second embodiment of the invention, FIG. 5 is a cross-sectional view illustrating the touch panel of FIG. 4 along a sectional line A2-A2, and FIG. 6 is a cross-sectional view illustrating the touch panel of FIG. 4 along a sectional line B2-B2. Referring to FIG. 4, a touch panel 200 includes a substrate 110, a plurality of first sensing series 120, a plurality of second sensing series 130, a plurality of first lines 140 and a plurality of second lines 250. More specifically, the present embodiment is similar to first embodiment. Particularly, reference numbers as recited in said two embodiments are referring to the same element. Description regarding the same elements may refer to related description in first embodiment, thus it is omitted hereinafter. Unlike first embodiment, the present embodiment includes a different disposition for the second lines 250. In view of FIG. 4 and FIG. 6, the second lines 250 are belonging to neither the first layer where the first sensing series 120 and the second electrode portions 132 are located, nor the second layer where the second crossing portions 134 are located. The second lines 250 are substantially made of a third layer, and the first layer and the second layer are both located between the third layer and the substrate 110. Meanwhile, the second lines 250 and the crossed second crossing portions 134 are spaced apart by an insulation layer 280. Accordingly, the second sensing series 130 are electrically independent from one another. After numbering the second sensing series 130 in sequence, the second line 250 connected to an N$^{th}$ second sensing series 130 and the second crossing portions 134 of an M$^{th}$ second sensing series 130 are spaced apart by the insulation layer 280, wherein N and M are positive integers, and N is not equal to M.

Figure 7:
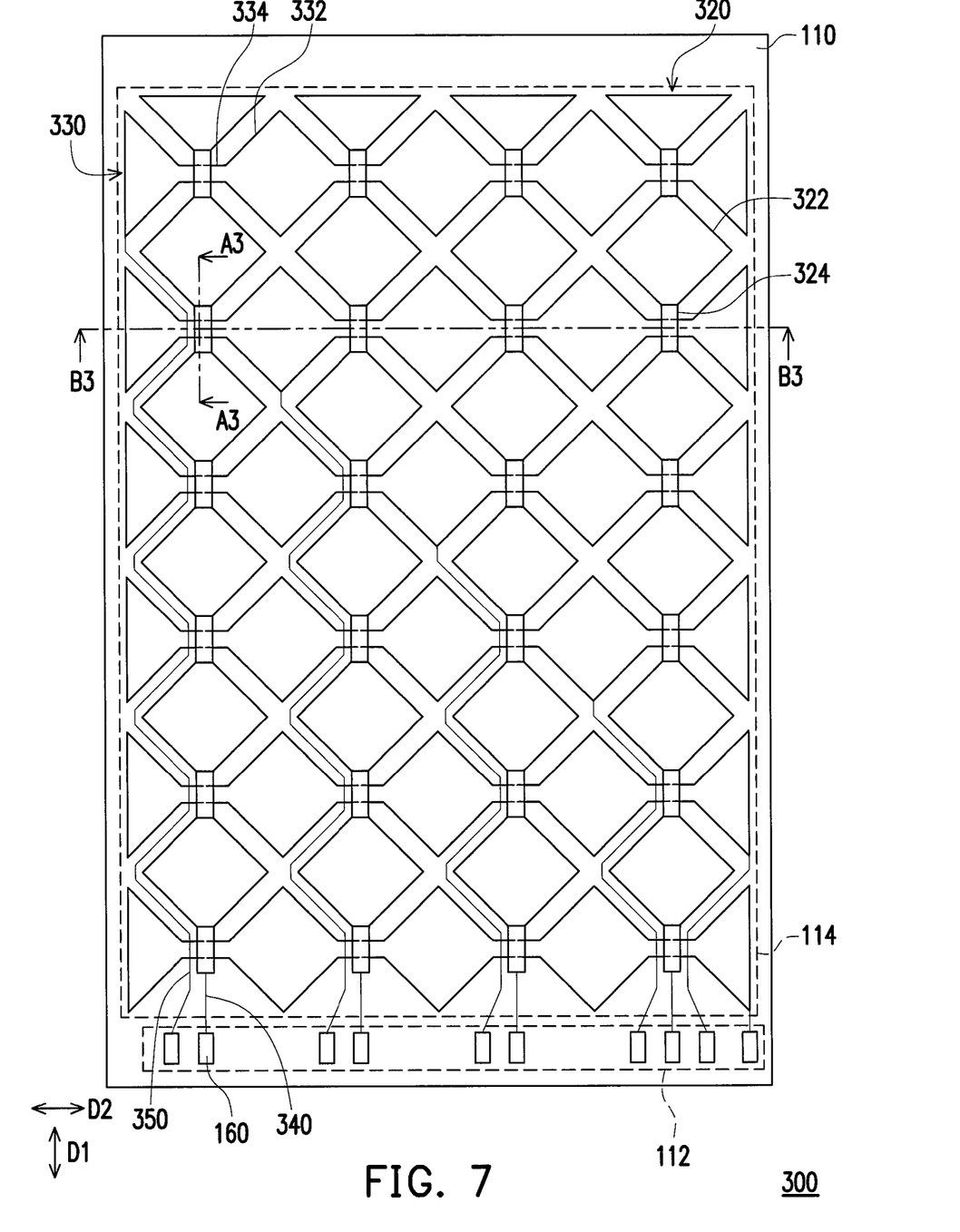
FIG. 7 is a top view of a touch panel according to third embodiment of the invention.
Figure 8:
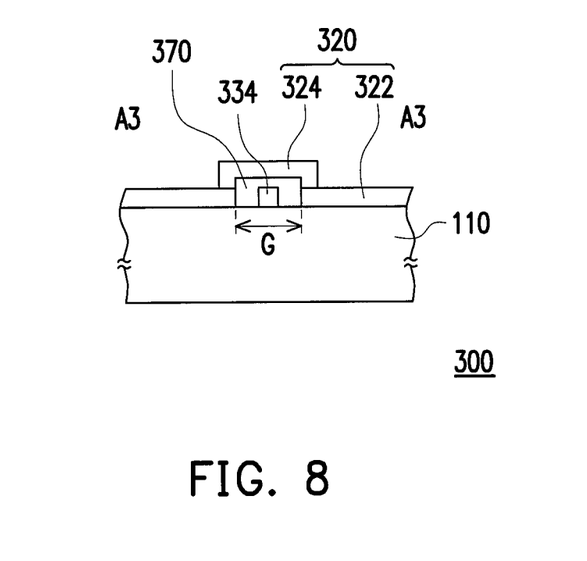
FIG. 8 is a cross-sectional view illustrating the touch panel of FIG. 7 along a sectional line A3-A3.
Figure 9:
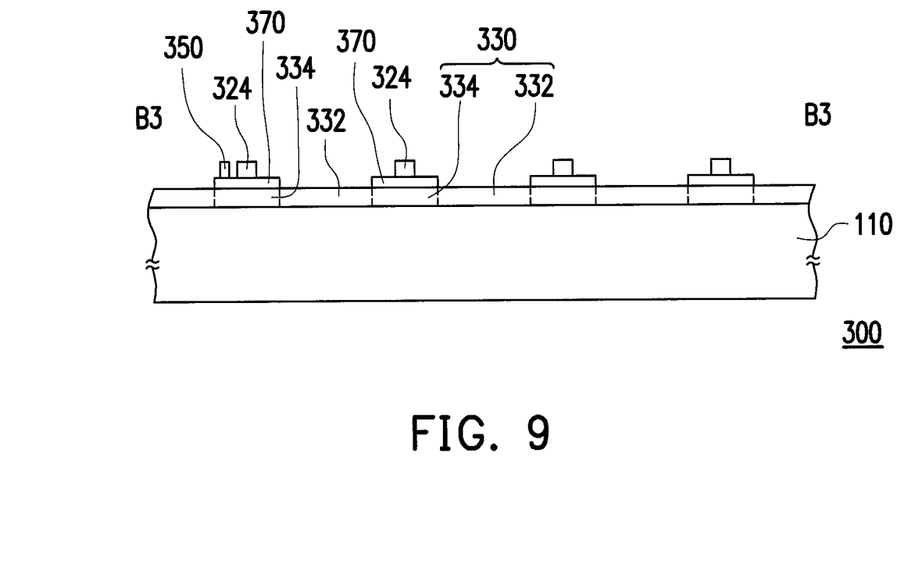
FIG. 9 is a cross-sectional view illustrating the touch panel of FIG. 7 along a sectional line B3-B3.

FIG. 7 is a top view of a touch panel according to third embodiment of the invention. FIG. 8 is a cross-sectional view illustrating the touch panel of FIG. 7 along a sectional line A3-A3, and FIG. 9 is a cross-sectional view illustrating the touch panel of FIG. 7 along a sectional line B3-B3. b Referring to FIG. 7, a touch panel 300 includes a substrate 110, a plurality of first sensing series 320, a plurality of second sensing series 330, a plurality of first lines 340 and a plurality of second lines 350. The substrate 110 has a bonding region 112 and a sensing region 114 adjacent to each other on a first direction D1. The first sensing series 320 are disposed in parallel in the sensing region 114. The second sensing series 330 are also disposed in parallel in the sensing region 114. The first lines 340 respectively connect to the first sensing series 320 and extend to the bonding region 112. The second lines 350 respectively connect to the second sensing series 330 and extend to the bonding region 112. Each of the first sensing series 320 extends along the first direction D1, and each of the second sensing series 330 extends along a second direction D2, wherein the first direction D1 intersects the second direction D2.

In the present embodiment, an arrangement layout of the first sensing series 320 and the second sensing series 330 in the top view is identical to that of first embodiment. Therefore, each of the first sensing series 320 includes a plurality of first electrode portions 322 and a plurality of first crossing portions 324 which are alternately connected along the first direction D1. Each of the second sensing series 330 includes a plurality of second electrode portions 332 and a plurality of second crossing portions 334 which are alternately connected along the second direction D2. Meanwhile, each of the second crossing portions 334 crosses one of the first crossing portions 324, and any adjacent two among the second electrode portions 332 and the first electrode portions 322 are spaced apart by a spacing region G. Meanwhile, each of the first lines 340 extends from the first sensing series 320 outwardly along the first direction D1 to the bonding region 112. Further, each of the second lines 350 also extends from the connected second sensing series 330 to the bonding region 112. However, in the present embodiment, each of the second lines 350 is disposed along the spacing region G. Accordingly, the touch panel 300 may provide the real thin border.

In the present embodiment, in view of FIG. 8 and FIG. 9, the entire second sensing series 330 and the second electrode portions 322 are made of a first layer, and the first crossing portions 324 are made of a second layer. Meanwhile, the first crossing portions 324 and the second crossing portions 334 are spaced apart by an insulation layer 370. The second lines 350 may be made of the second layer as the same to the first crossing portions 324. As similar to the foregoing embodiments, when the second sensing series 330 are arranged with serial numbers in sequence from the bonding region 112, the second line 350 connected to an $N^{th}$ second sensing series 330 and the second crossing portions 334 of an $M^{th}$ second sensing series 330 are spaced apart by the insulation layer 370. Herein, N and M are positive integers different from each other.

According to the foregoing embodiment, regardless of which layer are the electrode portions, connecting portions or the lines belonging to, the sensing series being electrically independent from each other may be realized as long as the crossing elements are in different layers and spaced apart from one another through an insulation layer. Therefore, said disposition regarding the layers is used only for demonstration and illustration, and are not intended to limit the scope of the invention. In view of first embodiment, the layer composed of the first sensing series 120 and the second electrode portions 132 may be manufactured only after the layer of the second crossing portions 134 is manufactured as a change instead of limited to a stacking order as shown in FIG. 2 and FIG. 3. In addition, the disposition regarding the bonding region in the foregoing embodiments is also used only for demonstration and illustration.

Figure 10:
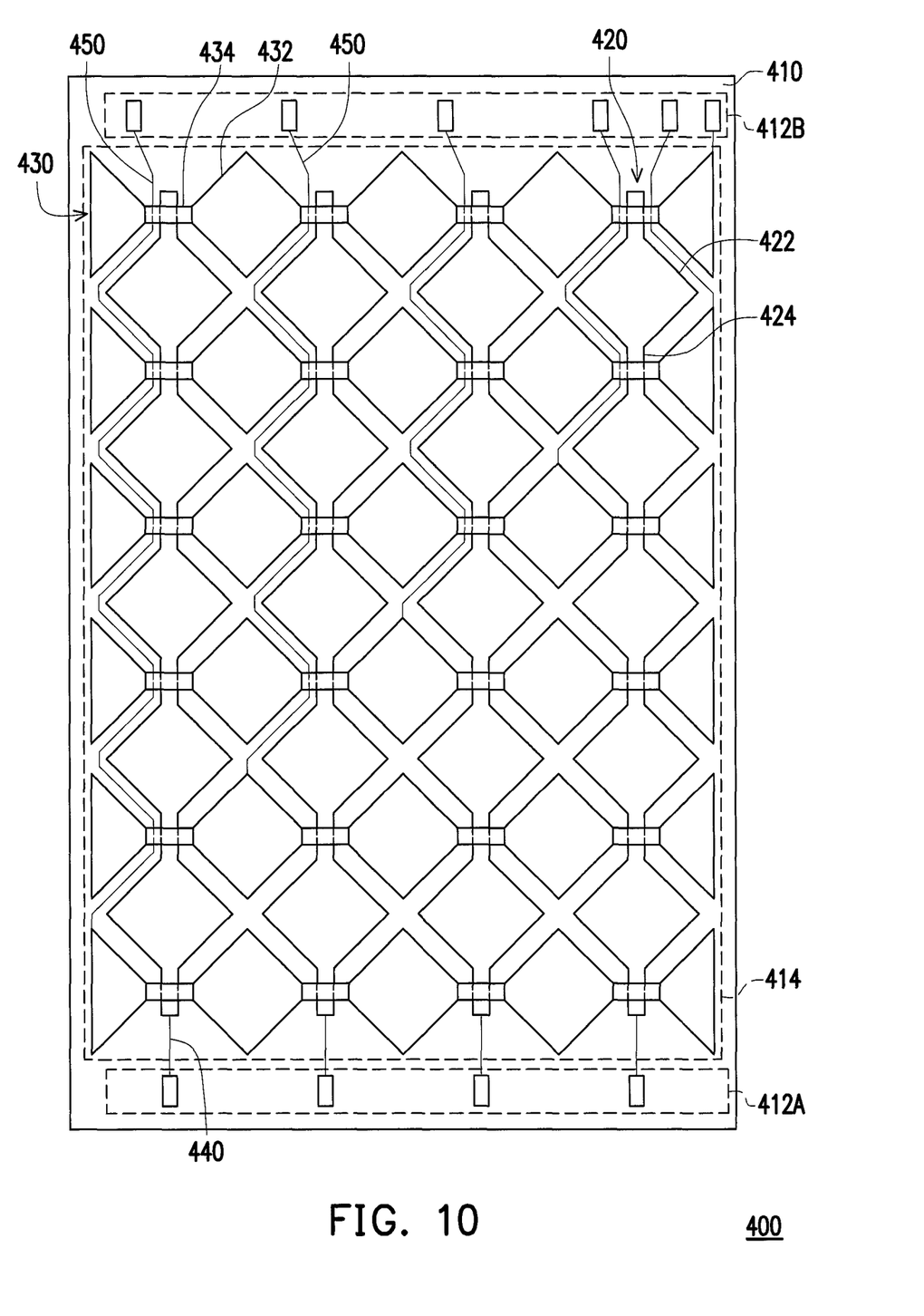
FIG. 10 is a top view of a touch panel according to fourth embodiment of the invention.

FIG. 10 is a top view of a touch panel according to fourth embodiment of the invention. Referring to FIG. 10, a touch panel 400 includes a substrate 410, a plurality of first sensing series 420, a plurality of second sensing series 430, a plurality of first lines 440 and a plurality of second lines 450. The substrate 410 includes a first bonding region 412A, a second bonding region 412B and a sensing region 414, wherein the sensing region 414 is located between the first bonding region 412A ad the second bonding region 412B. Meanwhile, a disposing relation of the first sensing series 420 and the second sensing series 430 may refer to related description of first embodiment or related description of third embodiment. In other words, the first sensing series 420 and the sensing series 430 may be replaced by the first sensing series 120 and the second sensing series 130 of first embodiment. Or, the first sensing series 420 and the sensing series 430 may be replaced by the first sensing series 320 and the second sensing series 330 of third embodiment. In addition, the first lines 440 extend from the connected first sensing series 420 to the first bonding region 412A, and the second lines 450 extend from the connected second sensing series 430 to the second bonding region 412B. In other words, the first liners 440 and the second lines 450 respectively extend towards two opposite sides.

Figure 11:
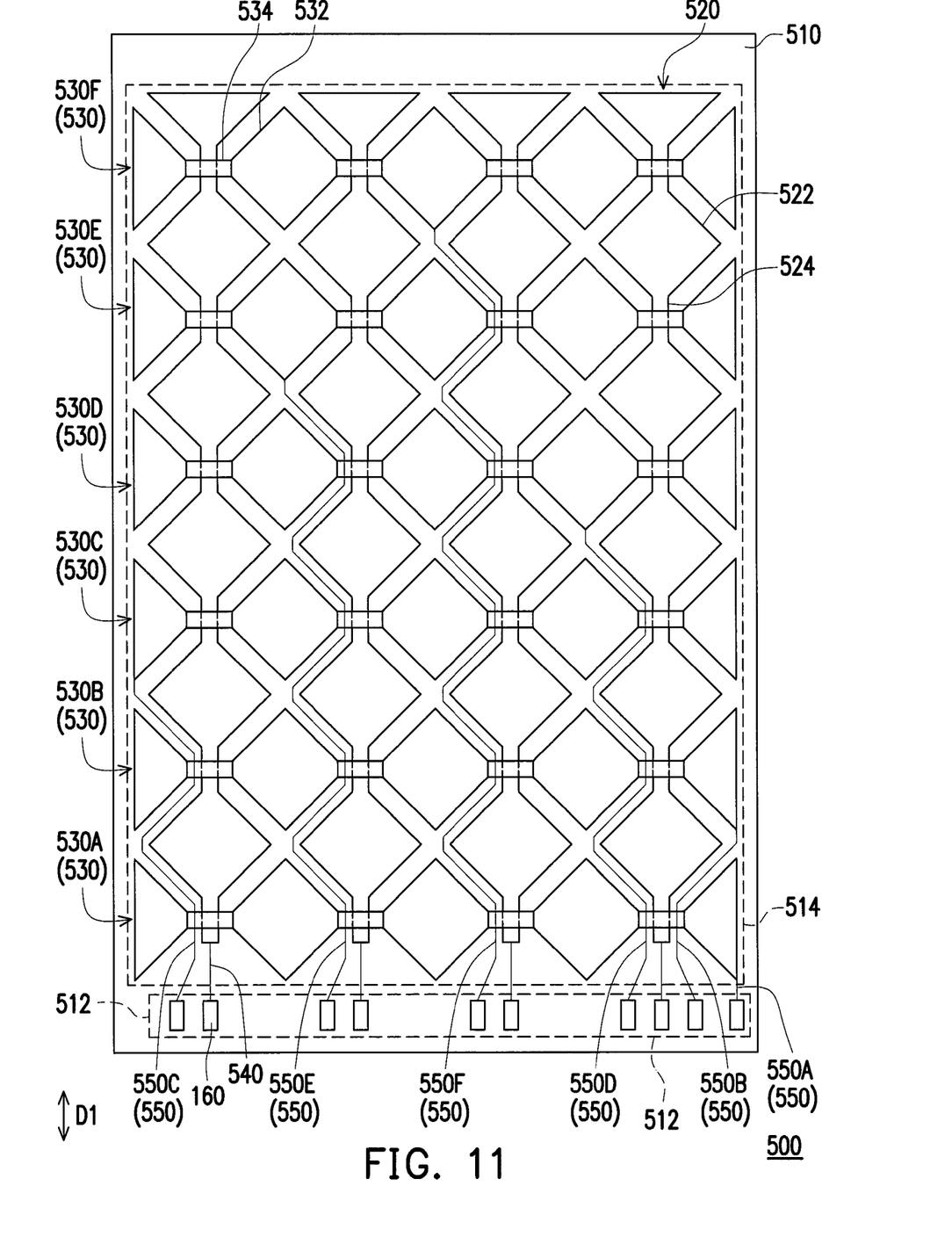
FIG. 11 is a top view of a touch panel according to fifth embodiment of the invention.

FIG. 11 is a top view of a touch panel according to fifth embodiment of the invention. Referring to FIG. 11, a touch panel 400 includes a substrate 510, a plurality of first sensing series 520, a plurality of second sensing series 530, a plurality of first lines 540 and a plurality of second lines 550. The substrate 510 includes a bonding region 512 and a sensing region 514, wherein the sensing region 414 and the bonding region 512 are adjacent to each other on the direction D1. Meanwhile, a disposing relation of the first sensing series 520 and the second sensing series 530 may refer to related description of first embodiment or related description of third embodiment. In other words, the first sensing series 520 and the sensing series 530 may be replaced by the first sensing series 120 and the second sensing series 130 of first embodiment. Or, the first sensing series 520 and the sensing series 530 may be replaced by the first sensing series 320 and the second sensing series 330 of third embodiment. In addition, the first lines 440 extend from the connected first sensing series 520 to the bonding region 412, and the second lines 450 also extend from the connected second sensing series 530 to the bonding region 412.

In the present embodiment, after outwardly arranging serial numbers in sequence from the bonding region 112, the second sensing series 530 are arranged into the second sensing series 530A to 530F, and a $1^{st}$ second sensing series 530A to a $6^{th}$ second sensing series 530F respectively connect to the second lines 550A to 550F. Because the second sensing series 530F is the one farthest away from the bonding region 512, a wiring length of the second line 550F is far the longest. If the second line 550F is connected to an end of the sensing series 530F, a signal transmitted in the second sensing series 530F must pass through the entire second line 550F and the entire second sensing series 530F, which may result in delay or distortion to the signal. Accordingly, in the present embodiment, by connecting the second line 550F to a center of the second sensing series 530F, aforesaid problem may be solved since a transmission path of the signal is shorten.

In the present embodiment, the second lines 550C, 550E, 550F, 550D, 550B and 550A are sequentially distributed along the second direction D2, and a length distribution of second line 550C, 550E, 550F, 550D, 550B and 550A is gradually increased before gradually decreasing in sequence along the second direction D2. As a result, the problem based on impedance difference which is caused by the signal transmitted between different second sensing series 530 may then be mitigated.

Figure 12:
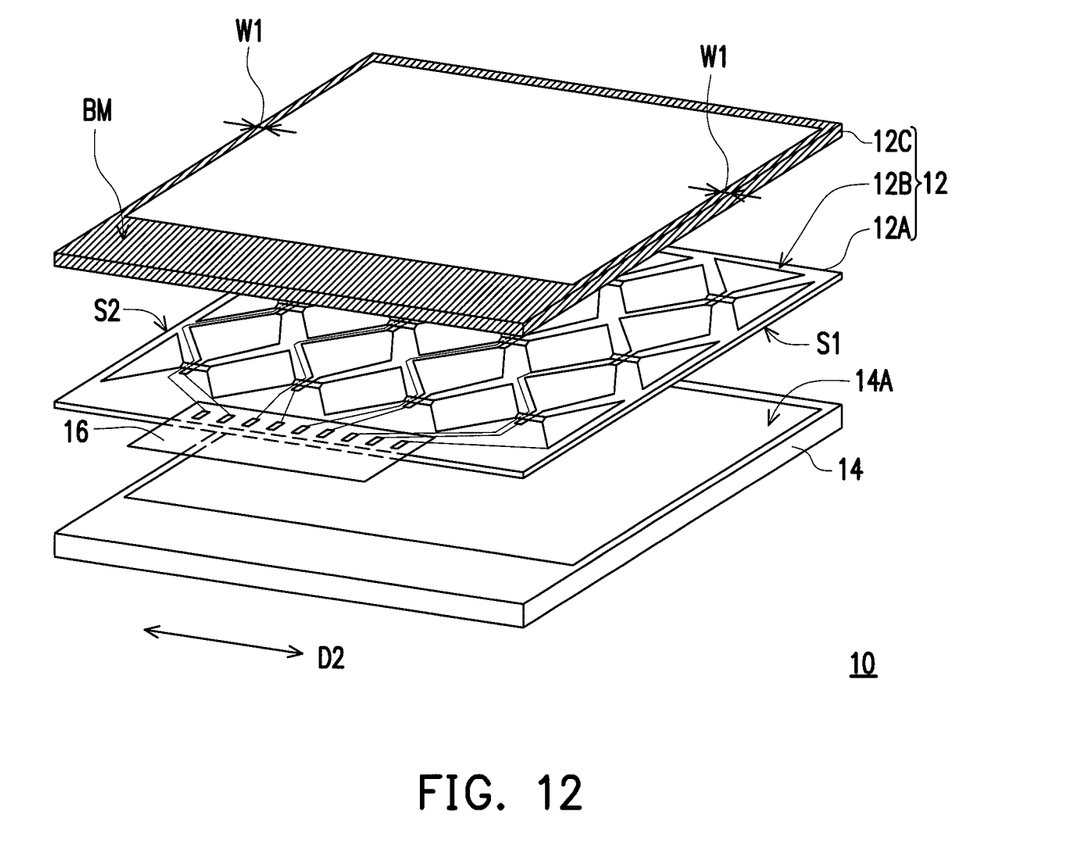
FIG. 12 illustrates a stacking relation of multiple elements in an electronic device according to an embodiment of the invention.

FIG. 12 illustrates a stacking relation of multiple elements in an electronic device according to an embodiment of the invention. Referring to FIG. 12, an electronic device 10 includes a touch panel 12 and a display panel 4, wherein the touch panel 12 is disposed above a display surface 14A of the display panel 14. The touch panel 12 includes a substrate 12A, a sensing element 12B and a cover plate 12C, wherein the sensing element 12B is disposed on the substrate 12A, and the substrate 12A is attached on the cover plates 12C. Meanwhile, a circuit board 16 is bonded on the substrate 12A to be electrically connected to the sensing element 12B.

More specifically, the substrate 12A of the touch panel 12 may be the substrate as recited in any one of first to third, and fifth embodiments, and the sensing element 12B may be the first sensing series, the second sensing series, the first lines and the second lines as recited in any one of the foregoing embodiments. Furthermore, in the present embodiment, the cover plate 12C includes a light shielding region BM, and the light shielding region BM at least blocks the bonding region (i.e., a region bonded to the circuit board 16) of the substrate 12A. For instance, the cover plate 12C may be a glass plate, and the light shielding region BM is a region defined by a shielding pattern layer on the glass plate. In view of FIG. 12, it is not required to dispose lines on edges S1 and S2 between the sensing element 12B and the substrate 12A. Therefore, a border width W1 of the light shielding region BM may be reduced to be quite thin, wherein the edges S1 and S2 are at the two opposite sides along the second direction as recited in the foregoing embodiments. As a result, the electronic device 10 may include the narrow border design which meets demands in the market. For instance, the border width W1 may be less than 5 mm, or may even be zero.

Figure 13:
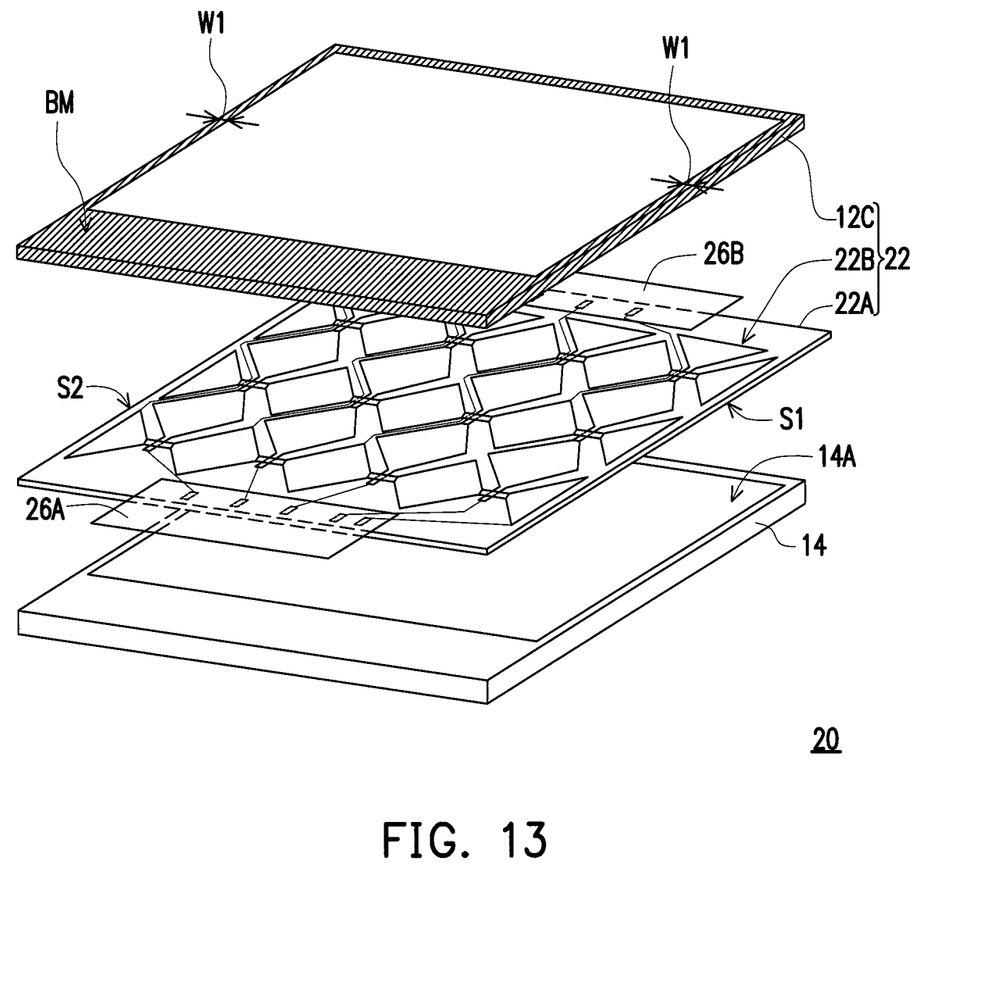
FIG. 13 illustrates a stacking relation of multiple elements in an electronic device according to another embodiment of the invention.

FIG. 13 illustrates a stacking relation of multiple elements in an electronic device according to another embodiment of the invention. Referring to FIG. 3, an electronic device 20 is similar to the electronic device 10 of FIG. 12, thus the same elements shown in the two embodiments are referred to the same reference number. More specifically, a difference between the electronic device 20 and the electronic device 10 is that, in a touch panel 22 of the electronic device 20, a substrate 22A and a sensing element 22B has the same design as described in fourth embodiment. Therefore, the electronic device 20 includes two circuit boards 26A and 26B connected to two opposite sides of the substrate 22A, respectively.

In summary, the lines are disposed on the spacing region between the electrode portions of the sensing series in the touch panel according to the embodiments of the invention. Accordingly, the touch panel according to the embodiment of the invention may provide the thin border. In addition, the lines connected to the sensing series may be connected at the center of side series instead of limited to be connected to the ends of the sensing series. Therefore, when the signal is transmitted between the signal and the lines, a signal variation caused by impedance during transmission may be mitigated.

What is claimed is:

1. A touch panel, comprising:
    a substrate having a bonding region and a sensing region adjacent to each other on a first direction;
    a plurality of first sensing series located in the sensing region, each of the first sensing series comprising a plurality of first electrode portions and a plurality of first crossing portions, and the first crossing portions and the first electrode portions being alternately connected along the first direction;
    a plurality of second sensing series located in the sensing region, each of the second sensing series comprising a plurality of second electrode portions and a plurality of second crossing portions, the second crossing portions and the second electrode portions being alternately connected along a second direction, the first direction intersecting the second direction, and each of the second crossing portions crossing one of the first crossing portions, wherein any adjacent two among the second electrode portions and the first electrode portions, any adjacent two among the first electrode portions, and any adjacent two among the second electrode portions are separated by a spacing region, respectively;
    a plurality of first lines respectively connecting to the first sensing series and extending to the bonding region; and
    a plurality of second lines respectively connecting to the second sensing series and extending to the bonding region, wherein each of the second lines is disposed along the spacing region, and one of the second lines connected to an $N^{th}$ second sensing series crosses one of the second crossing portions of an $M^{th}$ second sensing series, wherein N and M are positive integers, and N is not equal to M,
    wherein the bonding region comprises a first bonding region and a second bonding region, the sensing region is located between the first bonding region and the second bonding region, the first lines extends to the first bonding region, the second lines extends to the second bonding region, and the first bonding region, the sensing region and the second bonding region are sequentially arranged along the first direction.

2. The touch panel of claim 1, wherein the second electrode portions of each of the second sensing series comprise two terminal electrode portions and at least one intermediate electrode portion, and the at least one intermediate electrode portion is located between the two terminal electrode portions.

3. The touch panel of claim 2, wherein the second lines are disposed between the terminal electrode portions of the second sensing series.

4. The touch panel of claim 3, wherein the bonding region is adjacent to ends of the first sensing series.

5. The touch panel of claim 1, wherein the bonding region is adjacent to ends of the first sensing series.

6. The touch panel of claim 1, wherein the first sensing series and the second electrode portions are made of a first layer, the second crossing portions are made of a second layer, and the first crossing portions and the second crossing portions are spaced apart by a first insulation layer.

7. The touch panel of claim 6, wherein the second lines are made of the first layer, and the second line connected to the $N^{th}$ second sensing series and the second crossing portion of the $M^{th}$ second sensing series are spaced apart by the first insulation layer.

8. The touch panel of claim 6, wherein the second lines are made of a third layer, the first layer and the second layer are located between the third layer and the substrate, and the second line connected to the $N^{th}$ second sensing series and the second crossing portion of the $M^{th}$ second sensing series are spaced apart by a second insulation layer.

9. The touch panel of claim 1, wherein the second sensing series and the first electrode portions are made of a first layer, the first crossing portions are made of a second layer, and the first crossing portions and the second crossing portions are spaced apart by an insulation layer.

10. The touch panel of claim 9, wherein the second lines are made of the second layer, and the second line connected to the $N^{th}$ second sensing series and the second crossing portion of the $M^{th}$ second sensing series are spaced apart by the insulation layer.

11. The touch panel of claim 1, wherein a length distribution of the second lines is gradually increased before gradually decreasing in sequence along the second direction.

12. The touch panel of claim 1, further comprising a cover plate, and the substrate being attached on the cover plate.

13. The touch panel of claim 12, wherein the cover plate comprises a light shielding region, and the light shielding region blocks the bonding region.

14. The touch panel of claim 1, wherein the first sensing series are disposed in parallel.

15. The touch panel of claim 1, wherein the second sensing series are disposed in parallel.

16. An electronic device, comprising:
    a display panel having a display surface; and
    the touch display panel as claimed in claim 1 disposed above the display surface.

17. The electronic device of claim 16, wherein the touch panel further comprises a cover plate, the substrates is attached on the cover plate, and the cover plate comprises a light shielding region, wherein a border width of the light shielding region at two opposite sides along the second direction is less than 5 mm.

* * * * *